Dec. 3, 1929. P. BROWN 1,737,566
ELECTRIC FURNACE
Filed June 17, 1925 4 Sheets-Sheet 1
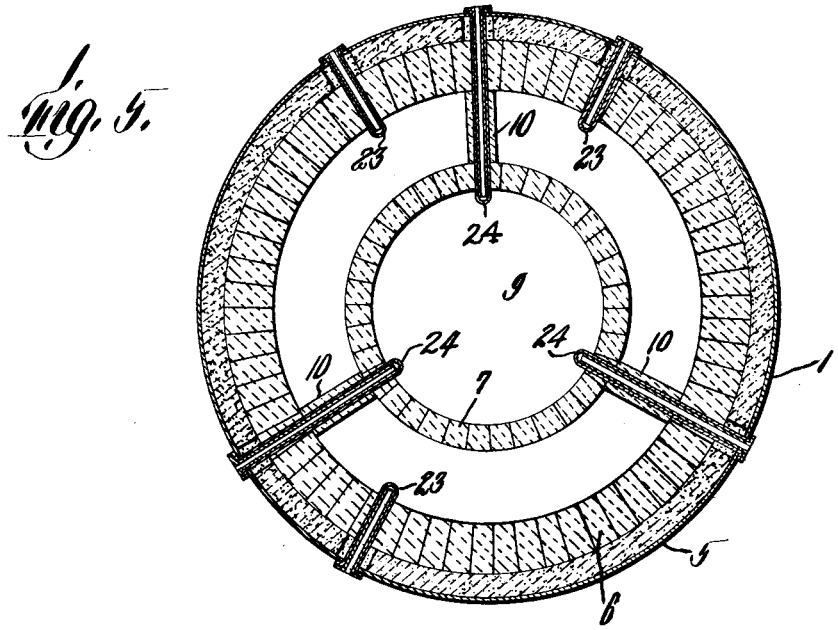
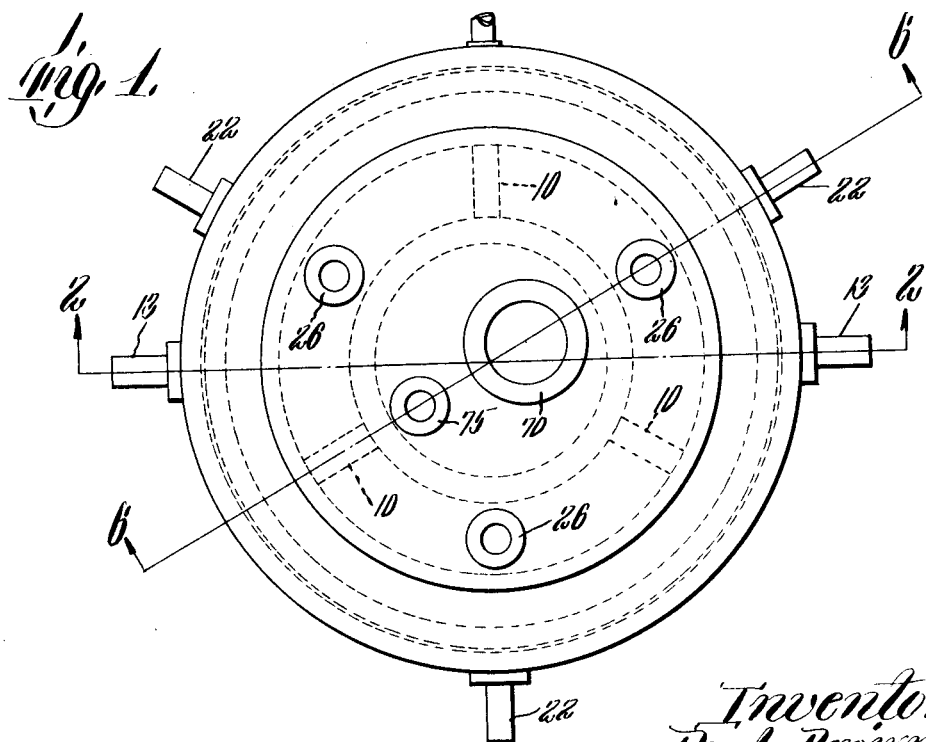

Dec. 3, 1929.                P. BROWN                1,737,566
                          ELECTRIC FURNACE
                        Filed June 17, 1925        4 Sheets-Sheet 2

Inventor
Paul Brown

Dec. 3, 1929.  P. BROWN  1,737,566
ELECTRIC FURNACE
Filed June 17, 1925   4 Sheets-Sheet 3

Inventor
Paul Brown

Dec. 3, 1929.　　　P. BROWN　　　1,737,566
ELECTRIC FURNACE
Filed June 17, 1925　　　4 Sheets-Sheet 4

Inventor
Paul Brown

Patented Dec. 3, 1929

1,737,566

UNITED STATES PATENT OFFICE

PAUL BROWN, OF BERLIN, NEW HAMPSHIRE, ASSIGNOR TO BROWN COMPANY, OF BERLIN, NEW HAMPSHIRE, A CORPORATION OF MAINE

ELECTRIC FURNACE

Application filed June 17, 1925. Serial No. 37,612.

This invention relates to the production of carbon bisulfide by the reaction of carbon and sulphur, under proper temperature conditions, in an electric furnace.

Carbon bisulfide is formed by the reaction of sulphur vapor with heated carbon according to the following reaction:

$$C + 2S = CS_2$$

The optimum temperature range for this reaction—that is, the temperatures at which the reaction takes place most rapidly—is from 800° to 1000° C., this rate being especially affected by the physical character of the carbon employed,—being comparatively rapid with a porous variety such as wood charcoal, and slow with dense varieties such as graphite or hard-baked carbon, such as are employed for the electrodes of arc lights or voltaic cells. If both the charcoal and sulphur vapor are brought together within their optimum reaction temperature range, the reaction is slightly exothermic: that is, some heat is evolved. If the sulphur vapor is supplied to the reaction chamber at lower than the optimum reaction temperature range, while the charcoal is supplied, say, at 800° C., some of the heat content of the charcoal is absorbed by the sulphur vapor to bring about an equalization of temperatures of both, so that, together with the heat evolved by the reaction, the reaction is about balanced,—or, in other words, the net heat effect of the reaction is about zero; while if the sulphur is supplied in liquid form, the heat necessary to vaporize and super-heat it to reacting temperatures is more than that available from the reaction, and from the higher temperature charcoal, and heat must be supplied from some external source if the optimum reaction temperature range is to be maintained.

However, even under conditions which result in maximum evolution of heat—that is, when the charcoal and sulphur are brought together at 800° to 1000° C.,—the amount of heat evolved by the reaction is ordinarily insufficient to make up for that lost by radiation and convection from the walls of the reaction chamber, and that carried away as sensible heat by the carbon bisulfide vapor, so that some heat must be supplied to the reaction mass to counterbalance these losses. In the manufacture of carbon bisulfide it has been the practice to introduce the charcoal into the reacton chamber at ordinary room temperature, while the sulphur was introduced into the bottom portion of the reaction chamber in liquid form. Under such conditions, the heat necessary to raise the reaction mass to the optimum reaction temperature range was produced in some cases by passing an electric current through a portion of the mass, which had been rendered electro-conductive by the addition to the charcoal of sufficient electro-conductive and highly sulphur resistant carbonaceous material, such as graphite or baked carbon. In a furnace of shaft design, the electrodes for this purpose were located near the base of the shaft. The charcoal and dense carbon were fed in at the top or a side portion of the shaft, and the sulphur vapor produced at the base between the electrodes travelled upwardly through the heated carbonaceous material in the shaft, forming carbon bisulfide. As the carbon and charcoal approached the bottom, the percentage of denser carbon become higher and higher, due to the more rapid conversion of the charcoal constituents of the carbonaceous material to carbon bisulfide. The proportion of hard carbon added was such that the mixture near the base of the shaft was sufficiently electro-conductive.

This method of procedure for maintaining the charge at reaction temperature range has the severe drawback that charcoal is a poor conductor of heat, so that any heat evolved or supplied by an external source at the base portion of the shaft remained largely concentrated near that portion. In order to bring any considerable depth of charcoal to reacting temperature, the heated zone had to be raised to a very high temperature,—so high, in fact, that not only was the optimum reaction temperature range far over-stepped in this zone, but it became extremely difficult to preserve the refractory furnace walls from destruction, and, due to the fusion of the inorganic matter in the ash resulting from the charcoal at the high temperatures, operations were frequently suspended because of the formation of arches or "scaffolds" in the furnace. Nevertheless, even with this exceedingly high temperature maintained at the base portion of the shaft, at best the temperature gradient through the charcoal remained so steep that only a shallow zone of the carbonaceous material was at the optimum reaction temperature range, with the result that the capacity of the furnace was strictly limited. This condition was obviously aggravated by the supplying of the sulphur in liquid form at the bottom of the shaft, because the heat necessary to vaporize it necessarily was applied to a relatively small surface of the pond or pool of molten sulphur, and through a material of low heat conductivity, so that the maximum temperature in the shaft had to be still further increased if larger furnace capacity was to be obtained.

One of the objects of the present invention is to provide a method for the production of carbon bisulfide and a furnace construction of a type such that maximum capacity per unit of furnace volume and moderate temperatures may be maintained everywhere in the furnace. In carrying out this object, the sulphur and charcoal are preferably introduced near to or within their optimum reaction temperature range. The furnace construction comprises a jacketing or heating chamber surrounding a reaction chamber, throughout which a temperature substantially within the optimum reaction temperature range may be maintained. The jacketing chamber wall which surrounds the reaction shaft is constructed of a heat conducting but refractory material, so that heat interchange between the shaft and jacket may take place with relative freedom.

Other features of the invention and advantages obtained thereby will be readily understood from the following description thereof, when taken in connection with the accompanying drawing, in which Figure 1 represents a plan view of the furnace.

Figure 2 shows a section of the same on the line 2—2 of Figure 1.

Figures 3, 4 and 5 are sections taken respectively on the lines 3—3, 4—4, and 5—5 of Figure 2.

Figure 2:
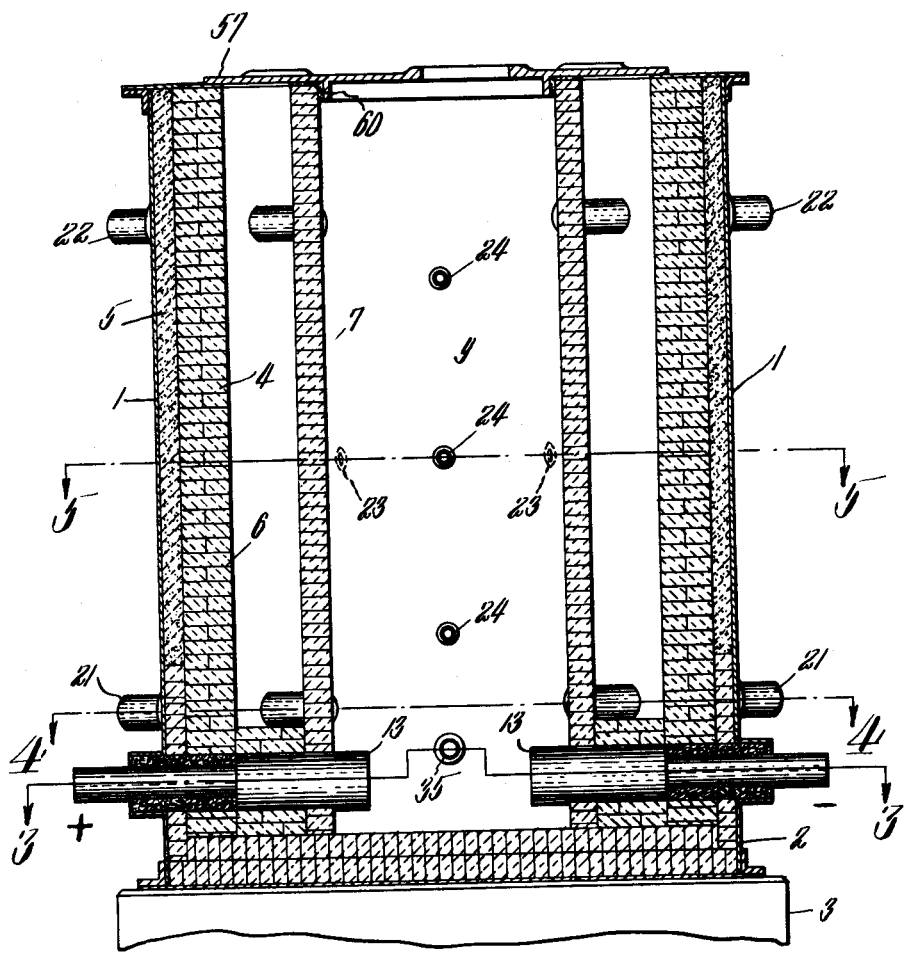
Figure 7:
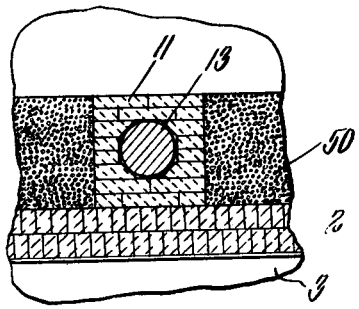
Figure 7 is a detailed view showing an arch support for an electrode.
Figure 3:
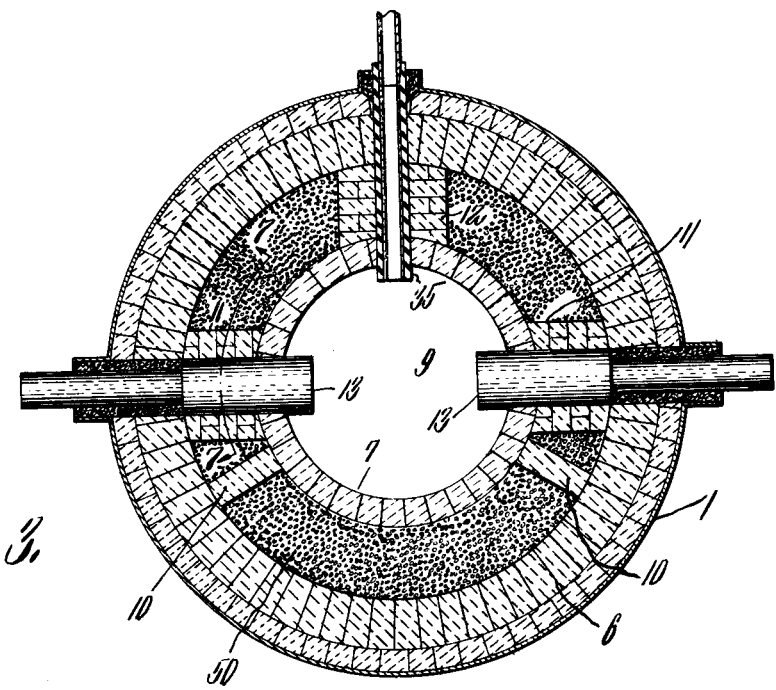
Figure 4:
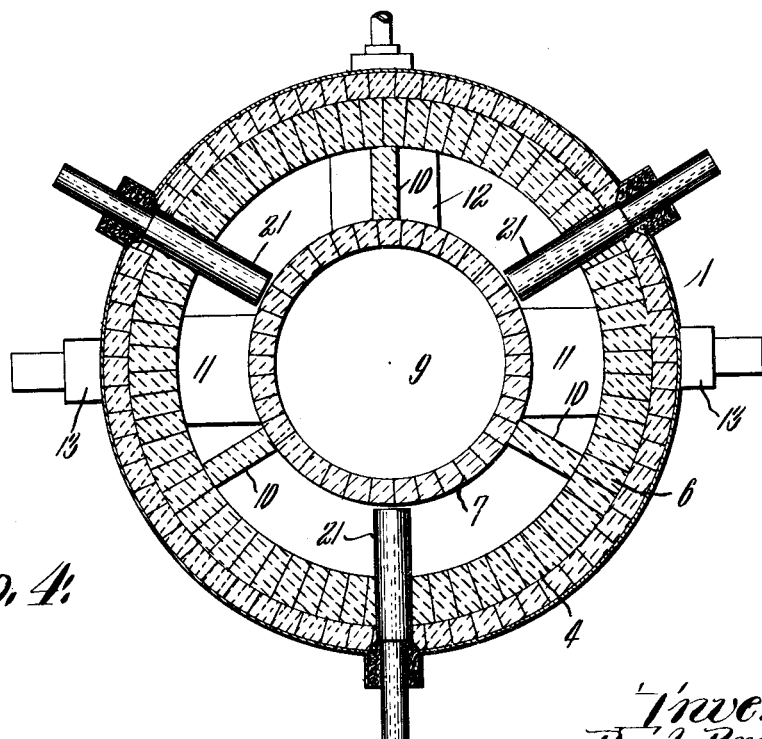

On the accompanying drawings; 1 is the usual outer furnace shell of iron or of steel. Within this shell 1, at its bottom, resting on a suitable support 3, is the flat floor 2 of fire brick, which constitutes a support for the furnace structure within the shell and the materials fed into the furnace, and constitutes the bottom of the furnace. The furnace structure comprises a thick outer circular wall or lining 4, which is formed in two layers or thicknesses. The outer layer 5 consists of insulating brick or powder, formed of such an inert material as kieselguhr (cellite); the inner and thicker layer 6 is constructed of a high temperature refractory, non-heat-conducting material, such as magnesia brick, or other fire brick. A relatively thinner inner circular wall 7 concentric with and spaced from the wall 4 is made of a high temperature refractory heat-conducting material, such as carborundum. The vertical chamber or shaft 9 enclosed by the wall 7 is thus surrounded by an annular jacketing chamber, bounded by the conducting inner circular wall 7, and by the insulating outer circular wall 4. This annular space is preferably divided into a plurality of equal size compartments by fire brick walls 10 extending radially from the wall 4 to the wall 7, and supported by the floor 2.

The lower portion of the furnace comprises a pair of solid fire brick radial walls or arches 11, 11, diametrically opposite to one another, and a third fire brick arch 12, equidistant from each of the pair. These arches as shown are of rectangular section, and are supported by the fire resistant brick floor 2. The pair 11, 11 serve as supports and coverings for a pair of central electrodes 13, 13, which are inserted in holes extending therethrough into the reaction shaft. Graphite bars cylindrical in form are employed as the electrodes, and are completely insulated from the furnace shell. A tube 35 for the introduction of sulphur vapor into the reaction shaft is inserted through a hole extending through the furnace structure into the reaction shaft,—the tube resting on the arch 12 and preferably delivering the stream of sulphur vapor into the reaction chamber, near the bottom thereof, at a point above the electrodes and between the inner end faces thereof,—though this is not essential.

The reaction shaft is externally heated to maintain a reaction temperature throughout its length. For this purpose, the heating compartments are filled with an electro-thermal mass 55,—i. e., a material which may be heated to a high temperature by passing an electric current therethrough, to which electric current is supplied by electrodes extending radially thereinto. Each compartment has a lower electrode 21 and an upper electrode 22 directly thereabove, which are effectively insulated from the shell 1 by a material capable of withstanding the severe temperature to which it is exposed. To permit proper temperature control to be maintained in the furnace, pyrometers are preferably inserted into the furnace in protecting tubes, some, 23, of which extend into the heating compartments, and others, 24, of which pass through the radial walls 10 and through the shaft wall 7, into the reaction chamber or shaft 9.

A top plate cover 57 may be bolted or otherwise suitably secured to the shell portion of the furnace. This plate is provided with charging valves 26, for the introduction of electro-thermal material into each of the heating compartments, and a quick-acting sliding gate valve 37 for the introduction of carbonaceous material into the reaction shaft. A pipe fitting 75 communicating with the reaction shaft is secured to the cover 57, and a pipe line 25 for conducting the carbon bisulfide vapor to the condenser is secured to the fitting.

Figure 6:
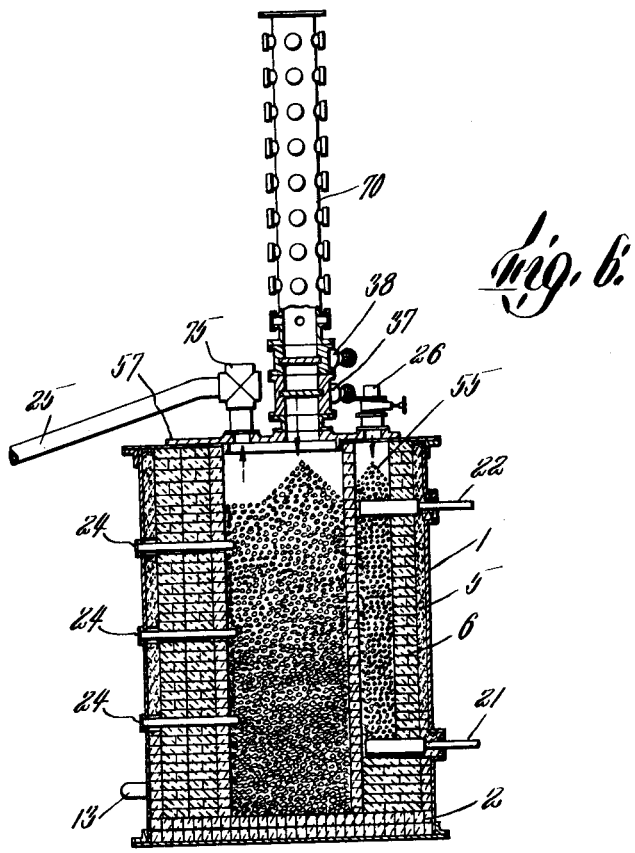
Figure 6 is a section taken on the line 6—6 of Figure 1, and illustrates the manner in which the charcoal is discharged into the reaction shaft at an elevated temperature.

In operation, the heating compartments are filled with the electro-thermal or electro-conductive heating medium 55, such as a waste resulting from the production of carbons for arc lights, which may be introduced thereinto through the charging valves 26. Charcoal preferably mixed with a suitable proportion of conducting material, such as broken carbon pencils, is heated to the desired temperature in a calciner 70 of a type described in a companion application, Serial No. 29,858, filed May 13, 1925, by James J. McLaughlin. This calciner is provided with a quick-acting sliding gate valve 38, similar to that carried by the plate cover on the furnace. It is bolted to a similar valve 37 on the furnace, as shown in Figure 6, and then both valves are quickly opened,—the charge of hot charcoal mixed with the dense carbon sliding into the furnace. The valves are then quickly closed. The sensible heat remaining in the charcoal is thus preserved for use in the furnace. The calciner is then removed from the top of the furnace for the preparation of another charge. The broken conducting carbon, however, may be supplied in small separate batches to the lower portion of the shaft 9, not calcined.

The graphite electrodes at the base portion of the reaction shaft are connected to an electrical supply source (not shown). Sulphur vapor is introduced into the bottom portion of the shaft, through the sulphur vapor tube 35, and is heated to some point within the optimum reaction temperature range and by reaction with the carbonaceous material forms carbon bisulfide, which is conducted through the vapor pipe line 25 leading from the top of the furnace into a condenser. Since the charcoal and sulphur have been introduced near or within the optimum reaction temperature range, obviously the only heat which it is necessary to supply is that required to balance radiation and convection from the shell, that amount which may be necessary to raise the temperature of charcoal and sulphur, and the sensible heat carried away by the product of the reaction. Part of this heat is supplied by the passage of electrical current through the base of the charge between the electrodes 13, 13, as has been the practice heretofore, and the radiation and convection losses from the shell are balanced by the plurality of heating chambers surrounding the reaction mass, in which the mass of electro-conductive heating material is maintained at a temperature equal to that of the charge. The heat contained in the mass in the outer chambers is conducted to that portion of the carbonaceous mass in the upper portion of the reaction chamber, and consequently the whole mass in the reaction chamber is maintained at a reaction temperature. Thus the reaction zone is extended to the upper limits of the furnace. The shaft 9 is maintained gas-tight from the exterior and from the heating compartments at the bottom by the masonry floor 2, and at the top by dry flexible packing, such as asbestos rope 60. The various tubes and electrodes inserted in the furnace make gas-tight joints with the furnace structure, thereby preventing vapor leakage into the atmosphere. The jacketing chamber is preferably filled at its lower portion from arch to arch with a heat-insulating material such as sand 50, because obviously it is not necessary to externally heat the reaction materials in the reaction zone maintained at optimum reaction temperature range by the central electrodes 13, 13.

Some of the advantages gained by the above construction are emphasized again, viz, that temperatures are moderate everywhere in the furnace, so that there is little destructive effect on the refractories; and the charcoal ash cannot fuse to form arches or "scaffolds" and thus necessitate the stopping of operations. The depth of charcoal at the optimum temperature is very greatly increased, and consequently the capacity of the furnace is raised.

What I claim is:

1. A furnace for the production of carbon bisulfide which comprises a reaction shaft for receiving heated carbonaceous material, a pair of electrodes near the bottom portion of said shaft, a vapor pipe line for the introduction of sulphur vapor between said electrodes, and a heating compartment surrounding said shaft and separated therefrom by a refractory heat-conducting wall.

2. A furnace of the type described comprising a vertical reaction shaft, a pair of electrodes near the bottom portion of said shaft, a heating compartment surrounding said shaft and separated therefrom by a refractory heat-conducting wall, said heating compartment including an electro-conductive heating medium and electrodes to which electric current may be supplied for heating said medium, and means entirely closing off said reaction shaft from said heating compartment.

3. A furnace of the class described comprising a vertical reaction shaft, a pair of electrodes near the base portion of said shaft, and a plurality of heating compartments substantially gas-tight surrounding said shaft and separated therefrom by a refractory heat-conducting wall, each of said heating compartments containing an electro-conductive heating medium and electrodes to which electric current may be supplied for heating said medium.

4. A furnace of the class described comprising a vertical reaction shaft, a pair of electrodes near the base portion of said shaft, a plurality of heating compartments substantially gas-tight surrounding said shaft and separated therefrom by a refractory heat-conducting wall, each of said heating compartments containing an electro-conductive heating medium and electrodes to which electric current may be supplied for heating said medium, and a refractory heat-insulating wall bounding said heating compartments, said furnace including a cover for said shaft and heating compartments comprising valves for the introduction of fresh conductive material into each of the heating compartments, a quick-acting valve for the introduction of hot carbonaceous material into the reaction shaft, and a pipe fitting communicating with the reaction shaft to which a vapor pipe line may be secured.

5. A furnace of the class described comprising a reaction shaft, a pair of electrodes near the bottom portion of said shaft, a plurality of heating compartments surrounding said shaft and separated therefrom by a refractory heat-conducting wall and from one another by heat-insulating walls, each of said heating compartments containing an electro-conductive heating medium and electrodes to which electric current may be supplied for heating said medium, a refractory heat-insulating wall bounding said heating compartments; said furnace including a refractory masonry floor construction and a top cover; said masonry and cover maintaining the reaction shaft gas-tight from the atmosphere.

6. A furnace of the class described comprising a reaction shaft, a pair of electrodes near the bottom portion of said shaft, a plurality of gas-tight heating compartments surrounding said shaft, separated therefrom by a refractory heat-conducting wall and from one another by heat-insulating walls; each of said heating compartments including an electro-conductive heating medium and electrodes to which electric current may be supplied for heating the same; and a refractory heat-insulating wall bounding said heating compartments.

7. An electric furnace for the production of carbon bisulfide from carbon and sulphur comprising a vertical reaction chamber of circular section, an inner circular wall surrounding said shaft constructed for refractory heat-conducting material, an outer refractory heat-insulating wall spaced from and concentric with said inner wall, substantially gas-tight from said inner wall forming an annulus therebetween, a shell for said outer wall, a plurality of walls extending radially from said outer to said inner wall and dividing said annulus into a plurality of compartments, an electro-conductive heating medium contained in each of said compartments, a pair of central electrodes at the bottom of said reaction chamber, and a pair of electrodes for each of said heating chambers.

In testimony whereof I have affixed my signature.

PAUL BROWN.